(12) United States Patent
Memishian

(10) Patent No.: US 7,412,887 B2
(45) Date of Patent: Aug. 19, 2008

(54) MULTIPLE AXIS ACCELERATION SENSOR

(75) Inventor: John Memishian, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 340 days.

(21) Appl. No.: 11/204,591

(22) Filed: Aug. 16, 2005

(65) Prior Publication Data

US 2006/0037397 A1 Feb. 23, 2006

Related U.S. Application Data

(60) Provisional application No. 60/602,129, filed on Aug. 17, 2004.

(51) Int. Cl.
G01P 15/125 (2006.01)
(52) U.S. Cl. .............. 73/514.32; 73/514.21; 73/514.01
(58) Field of Classification Search .............. 73/514.32, 73/1.82, 1.38, 1.78, 65.09, 65.06, 1.37, 73
See application file for complete search history.

(56) References Cited

U.S. PATENT DOCUMENTS

| 4,932,259 A | 6/1990 | Ueno ...................... 73/517 AV |
|---|---|---|
| 4,987,779 A | 1/1991 | McBrien ...................... 73/514 |
| 5,006,487 A * | 4/1991 | Stokes .......................... 438/52 |
| 5,134,881 A | 8/1992 | Henrion et al. ............... 73/514 |
| 5,345,824 A | 9/1994 | Sherman et al. ............... 73/517 |
| 5,383,364 A * | 1/1995 | Takahashi et al. ......... 73/514.32 |
| 5,440,939 A | 8/1995 | Barny et al. ..................... 73/514 |
| 5,441,300 A | 8/1995 | Yokota et al. ............... 280/735 |
| 5,487,305 A | 1/1996 | Ristic et al. .................... 73/514 |
| 5,511,420 A | 4/1996 | Zhao et al. ..................... 73/514 |
| 5,574,222 A | 11/1996 | Offenberg ................ 73/514.32 |
| 5,587,518 A | 12/1996 | Stevenson et al. ............. 73/1 D |

(Continued)

FOREIGN PATENT DOCUMENTS

DE 19537546 4/1997

(Continued)

OTHER PUBLICATIONS

Lemkin et al., *A 3-Axis Force Balanced Accelerometer Using a Single Proof-Mass*, Transducers '97, 1997 International Conference on Solid-State Sensors and Actuators, Chicago, Jun. 16, 19, 1997, 4 pages.

(Continued)

*Primary Examiner*—Hezron E. Williams
*Assistant Examiner*—Gunnar J Gissel
(74) *Attorney, Agent, or Firm*—Bromberg & Sunstein LLP

(57) ABSTRACT

One or more fixed sensing electrodes are employed to sense movement of a mass both within the plane of the mass/electrodes and along an axis normal to that plane. In order to measure movement of the mass along the axis normal to the plane, a reference capacitance is measured between the fixed sensing electrode(s) and an underlying conducting plane and a measurement capacitance is measured between the mass and the underlying conducting plane. A value Cv-KCf may be computed, where Cf is the reference capacitance, Cv is the measurement capacitance, and K is a predetermined constant. In accordance with certain embodiments of the invention, a standard one or two axis acceleration sensor that measures movement of the mass within the plane can be used to also measure movement of the mass in the axis normal to the plane.

21 Claims, 6 Drawing Sheets

U.S. PATENT DOCUMENTS

| | | | | |
|---|---|---|---|---|
| 5,748,004 | A | 5/1998 | Kelly et al. | 73/514 |
| 5,780,740 | A | 7/1998 | Lee et al. | 73/504.12 |
| 5,939,633 | A | 8/1999 | Judy | 73/514.32 |
| 6,070,464 | A | 6/2000 | Koury et al. | 73/514.32 |
| 6,370,954 | B1 | 4/2002 | Zerbini et al. | 73/514.01 |
| 6,513,380 | B2 | 2/2003 | Reeds, III et al. | |
| 6,591,678 | B2 * | 7/2003 | Sakai | 73/514.36 |
| 6,892,576 | B2 | 5/2005 | Samuels et al. | 73/514.32 |
| 2002/0059829 | A1 * | 5/2002 | Sakai | 73/504.12 |
| 2002/0189355 | A1 * | 12/2002 | Leonardson | 73/514.32 |

FOREIGN PATENT DOCUMENTS

| | | |
|---|---|---|
| EP | 1083144 | 3/2001 |
| EP | 1083430 | 3/2001 |

OTHER PUBLICATIONS

Authorized Officer Gregory Adam, *The International Search Report and The Written Opinion of the International Searching Authority*, International Searching Authority, Dec. 5, 2005, 13 pages.

Tom C. Wang, Joyce Ho, TSAR & TSAI Law Firm, Taiwan, Correspondence regarding office action from Taiwan Intellectual Property Office, May 11, 2007, 4 pages.

*Precision ± 1.7 g Single/Dual Axis Accelerometer*, Analog Devices, Document ADXL103/ADXL203 Rev.0, 2004, 12 pages.

Ahmad, et al., *A Two-Dimensional Micromachined Accelerometer*, IEEE Transactions on Instrumentation and Measurement, vol. 46, No. 1, Feb. 1997, 9 pages.

Spangler, et al., *ISAAC—Integrated Silicon Automotive Accelerometer*, Tranducers '95, Eurosensors IX, 4 pages.

European Patent Office, Communication Pursuant to Article 96(2) EPC, Examination Report, Jun. 8, 2007, 2 pages.

Authorized Office, Reto, D., *International Preliminary Report on Patentability and Written Opinion of the International Searching Authority*, International Application No. PCT/US2005/029066, Mar. 1, 2007, 8 pages.

* cited by examiner

MULTIPLE AXIS ACCELERATION SENSOR

PRIORITY

The present application claims priority from the U.S. Provisional Patent Application No. 60/602,129 filed Aug. 17, 2004, which is hereby incorporated herein by reference in its entirety.

FIELD OF THE INVENTION

The invention generally relates to inertial sensors and, more particularly, the invention relates to accelerometers.

BACKGROUND OF THE INVENTION

Inertial sensors, such as accelerometers and gyroscopes, are often used to sense motion. Motion can be sensed in a linear direction in one or more axes or as rotations about one or more axes. Inertial sensors are used in a wide variety of applications.

Some micromachined accelerometers include a movable mass that has finger structures that interdigitate with fixed sensing fingers. The mass, the fixed sensing fingers, and other sensor elements (e.g., suspension structures for the mass) are typically fabricated from the same wafer and thus are nominally oriented in the same plane. Some of the elements, such as the fixed sensing fingers and fixed portions of the suspension structures, are anchored to an underlying substrate such that the fixed sensing fingers and the mass are separated from the substrate by some distance (referred to hereinafter as the "spacer gap"). Movement of the mass within the plane is typically sensed by measuring capacitance between the mass fingers and the fixed sensing fingers, with a change in capacitance reflecting an in-plane lateral acceleration. Within the plane, movement of the mass may be sensed along a single axis (i.e., an X or Y axis) or along two axes (i.e., X and Y axes).

Exemplary micromachined accelerometers of the type described above are distributed by Analog Devices, Inc. of Norwood, Mass. and are described generally in the ADXL103/ADXL203 Single/Dual Axis Accelerometer data sheet, which is hereby incorporated herein by reference in its entirety.

Some micromachined accelerometers are designed to sense motion along an axis that is normal to the plane of the substrate (i.e., the Z axis), but not along the X or Y axes. Some exemplary Z-axis accelerometers employ so-called trampoline, piston, or teeter-totter mechanisms to sense Z-axis movements.

It is often desirable to sense motion in all three axes. This is often accomplished by employing multiple single or dual axis accelerometers that are oriented along different axes. For example, each of three single-axis accelerometers can be oriented along a different one of the axes.

Accelerometers that are capable of sensing motion in all three axes are being developed. An exemplary three-axis accelerometer is described in U.S. Pat. No. 5,487,305, which is hereby incorporated herein by reference in its entirety. In this three-axis accelerometer, a separate conductor, held above the mass/finger plane by posts extending from the substrate, is used to sense Z-axis movement of the mass, while more traditional fingers are used to sense in-plane movement of the mass along the X and Y axes.

SUMMARY OF THE INVENTION

In embodiments of the present invention, one or more fixed sensing fingers are employed when sensing movement of a mass both within the plane of the mass/fingers and along an axis normal to that plane. In order to measure movement of the mass along the axis normal to the plane, a reference capacitance is measured between the fixed sensing finger(s) and an underlying conducting plane, and a measurement capacitance is measured between the mass and the underlying conducting plane. A value Cv-KCf may be computed, where Cf is the reference capacitance, Cv is the measurement capacitance, and K is a predetermined constant. In accordance with certain embodiments of the invention, a standard one or two axis acceleration sensor that measures movement of the mass within the plane can also be used to measure movement of the mass in the axis normal to the plane.

In accordance with one aspect of the invention there is provided apparatus having a plurality of sensing elements oriented in a device plane. The sensing elements include at least one fixed sensing electrode and a mass suspended so as to be movable relative to the at least one fixed sensing electrode along at least one axis in the device plane as well as along an axis normal to the device plane. The apparatus further includes a controller that senses movement of the mass along at least one axis in the device plane and along the axis normal to the device plane. The controller senses movement of the mass within the device plane using at least one capacitor having a plate formed from at least one fixed sensing electrode and a plate formed by a surface that moves with the mass. The controller senses movement of the mass along the axis normal to the device plane using a measurement capacitor and a reference capacitor. The measurement capacitor has a plate formed by the mass and plate formed by an underlying conducting plane. The reference capacitor has a plate formed from at least one fixed sensing electrode uses for sensing movement of the mass within the device plane and a plate formed by the underlying conducting plane.

In accordance with another aspect of the invention there is provided a method for sensing acceleration in an accelerometer having a plurality of sensing elements oriented in a device plane. The sensing elements include at least one fixed sensing electrode and a mass suspended so as to be movable relative to the at least one fixed sensing electrode along at least one axis in the device plane and along an axis normal to the device plane. The method involves sensing movement of the mass along at least one axis in the device plane using at least one capacitor having a plate formed from at least one fixed sensing electrode and a plate formed by a surface that moves with the mass. The method also involves sensing movement of the mass along the axis normal to the device plane using a measurement capacitor and a reference capacitor. The measurement capacitor has a plate formed by the mass and plate formed by an underlying conducting plane. The reference capacitor has a plate formed from at least one fixed sensing electrode uses for sensing movement of the mass within the device plane and a plate formed by the underlying conducting plane.

In accordance with another aspect of the invention there is provided apparatus for use with an acceleration sensor having a plurality of sensing elements oriented in a device plane. The sensing elements include at least one fixed sensing electrode and a mass suspended so as to be movable relative to the at least one fixed sensing electrode along at least one axis in the device plane and along an axis normal to the device plane. The apparatus includes means for sensing movement of the mass along at least one axis in the device plane using at least one capacitor having a plate formed from at least one fixed sensing electrode and a plate formed by a surface that moves with the mass. The apparatus also includes means for sensing movement of the mass along the axis normal to the device plane using a measurement capacitor and a reference capacitor. The measurement capacitor has a plate formed by the mass and plate formed by an underlying conducting plane.

The reference capacitor has a plate formed from at least one fixed sensing electrode uses for sensing movement of the mass within the device plane and a plate formed by the underlying conducting plane.

In various embodiments, movement of the mass may be sensed along the two perpendicular axes in the device plane as well as along the axis normal to the device plane. Sensing movement of the mass along the axis normal to the device plane may involve measuring a reference capacitance between at least one fixed sensing electrode and an underlying conducting plane and measuring a measurement capacitance between the mass and the underlying conducting plane. Sensing movement of the mass along the axis normal to the device plane may further involve computing a value Cv-KCf, where Cf is the reference capacitance, Cv is the measurement capacitance, and K is a predetermined constant. K may be adjusted to compensate for a zero-acceleration position of the mass and may be determined by scaling a clock edge used to read the larger of the reference capacitance and the measurement capacitance. The value Cv-KCf may be read on a single clock edge. A plurality of fixed sensing electrodes may be used collectively to form the reference capacitor. The underlying conducting plane may be disconnected from a fixed bias or bootstrap signal for measuring the reference and measurement capacitances.

BRIEF DESCRIPTION OF THE DRAWINGS

The foregoing and advantages of the invention will be appreciated more fully from the following further description thereof with reference to the accompanying drawings wherein.

DETAILED DESCRIPTION OF SPECIFIC EMBODIMENTS

Figure 1:
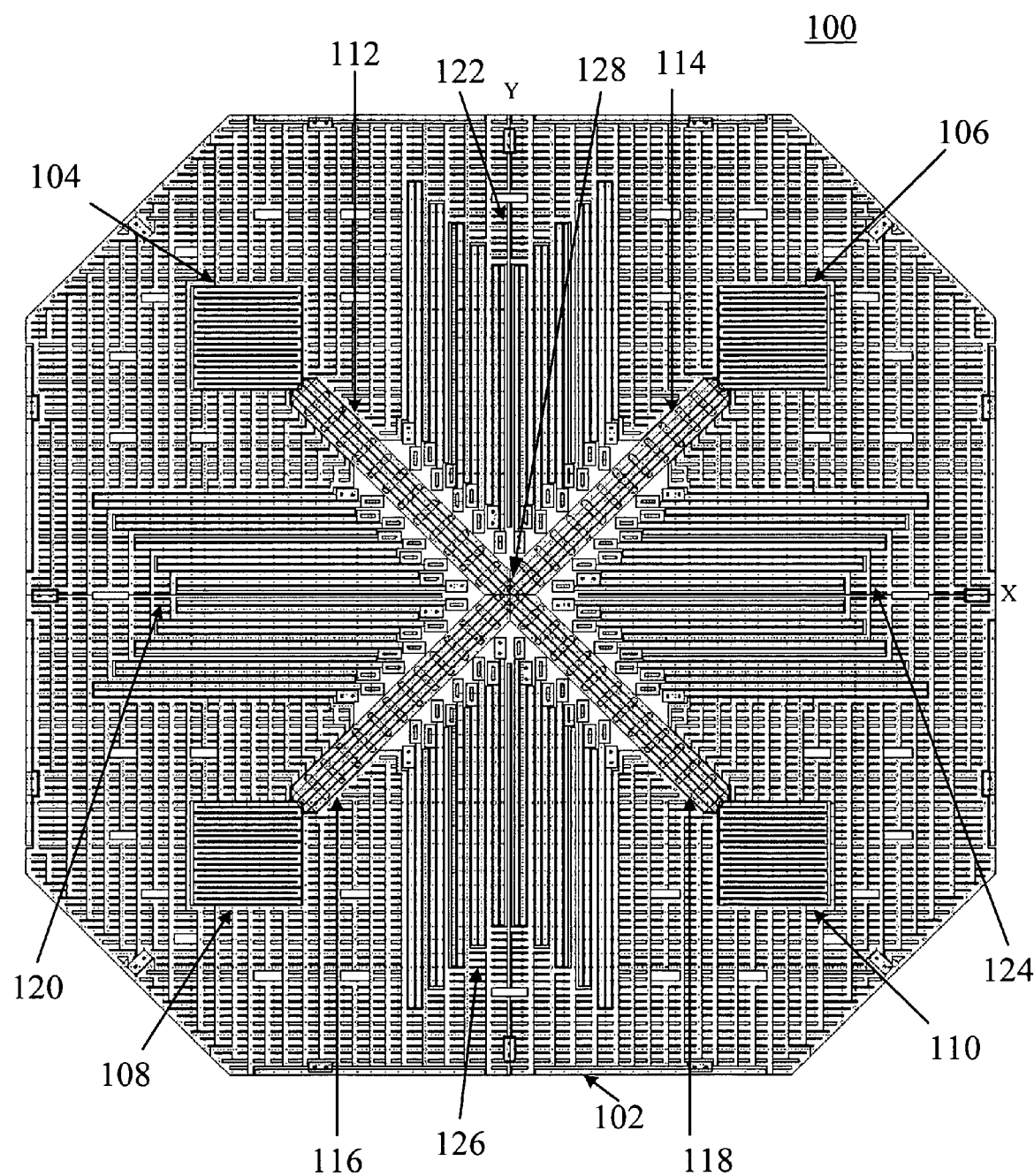
FIG. 1 shows a top view of a first exemplary two-axis accelerometer in accordance with an embodiment of the present invention.

Definitions. As used in this description and the accompanying claims, the following terms shall have the meanings indicated, unless the context otherwise requires:

The "device plane" is a plane in which various sensor elements, such as a movable mass and fixed sensing electrodes, are nominally oriented.

The "conducting plane" is an electrically separate layer (or layers) of material underlying the sensor elements and forming a plate of one or more capacitors. The conducting plane may be a substrate to which certain sensing elements are affixed or may be separate from the substrate. The conducting plane is typically parallel to the device plane and separated from the device plane by some distance (referred to herein as the "spacer gap"). The conducting plane is not necessarily tied to ground or to a constant or fixed potential.

The "measurement capacitor" is a capacitor that is used in sensing movement of the mass along an axis normal to the device plane. The measurement capacitor typically has one plate formed by the mass and the other plate formed by the underlying conducting plane. The measurement capacitor has a capacitance that varies with the distance of the mass from the underlying conducting plane.

The "reference capacitor" is a capacitor that is used in sensing movement of the mass along an axis normal to the device plane. The reference capacitor typically has one plate formed by at least one fixed sensing electrode and the other place formed by the underlying conducting plane. In accordance with embodiments of the present invention, the reference capacitor does not sense movement of the mass but instead provides a reference capacitance that is used to correct for certain errors.

In embodiments of the present invention, one or more fixed sensing electrodes (referred to herein as fingers) are employed when sensing movement of a mass (also referred to as a "beam") both within the plane of the mass/fingers (referred to herein as the "device plane") and along an axis normal to the device plane. Within the device plane, movement of the mass may be sensed along a single axis (i.e., an X or Y axis) or two axes (i.e., X and Y axes). Movement of the mass is also sensed along an axis normal to the device plane (i.e., the Z axis). Thus, an XYZ or XZ or YZ sensor can be formed, with a single proof mass shared by all axes. Furthermore, as described below, a standard acceleration sensor commonly used for measuring acceleration in one or two dimensions, such as the acceleration sensor employed in the ADXL203 XY accelerometer (distributed by Analog Devices, Inc. of Norwood, Mass.), can be used to sense acceleration along three axes, including a correction for manufacturing variation of the spacer gap between various sensing elements and an underlying conducting plane.

In accordance with typical embodiments of the present invention, the mass, the fixed sensing fingers, and other sensor elements (e.g., suspension structures for the mass) are fabricated from the same wafer and thus are nominally oriented in the same plane (i.e., the device plane). Some of the elements, such as the fixed sensing fingers and fixed portions of the suspension structures, may be anchored to an underlying substrate. The mass typically includes fingers that interdigitate with the fixed sensing fingers.

FIG. 1 shows a top view of a first exemplary two-axis acceleration sensor 100 including, among other things, a mass with integral fingers 102; mass support structures including suspension springs (104, 106, 108, 110) and support arms (112, 114, 116, 118), and fixed sensing fingers (120, 122, 124, 126). The fixed sensing fingers (120, 122, 124, 126) are interdigitated with the mass fingers, with typically a fixed finger on each side of each mass finger.

In this embodiment, the four support arms (112, 114, 116, 118) are configured in a cruciform configuration that is anchored to the substrate (not shown) by a single square anchor 128 positioned at the point where the four support arms meet. Among other things, the square anchor reduces the amount of bending or twisting about the anchor by torque generated by the support arms. It should be noted that the present invention is in no way limited to a single anchor or to anchoring at the mass' center of mass.

Figure 2:
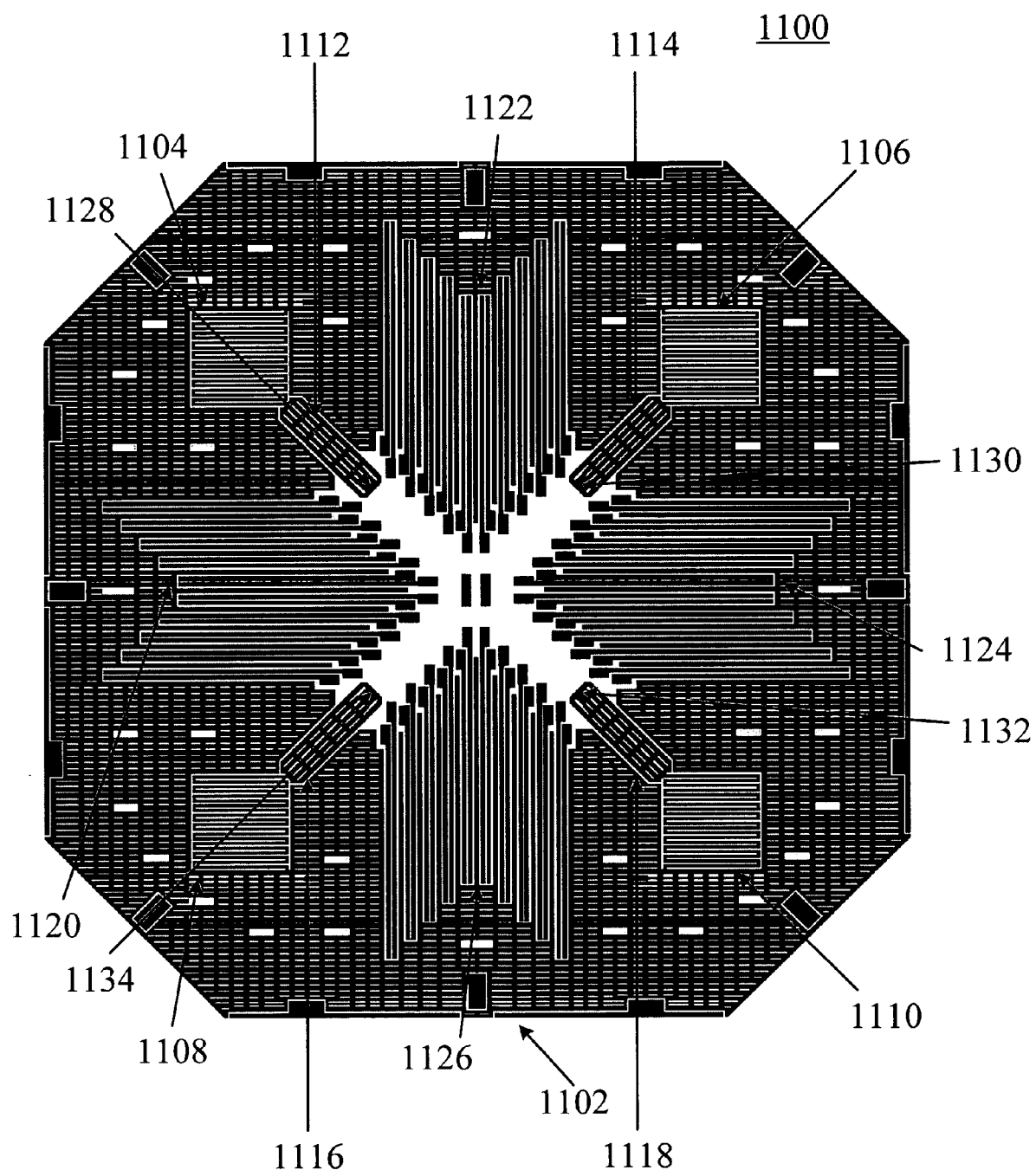
FIG. 2 shows a top view of a second exemplary two-axis accelerometer in accordance with an embodiment of the present invention.

FIG. 2 shows a top view of a second exemplary two-axis acceleration sensor 1100 including, among other things, a mass with integral fingers 1102; mass support structures including suspension springs (1104, 1106, 1108, 1110) and support arms (1112, 1114, 1116, 1118), and fixed sensing fingers (1120, 1122, 1124, 1126). The fixed sensing fingers (1120, 1122, 1124, 1126) are interdigitated with the mass fingers, with typically two fixed sensing fingers between each pair of mass fingers. In this embodiment, the four support arms (1112, 1114, 1116, 1118) are anchored individually to the substrate by anchors 1128, 1130, 1132, and 1134, respectively.

Figure 3:
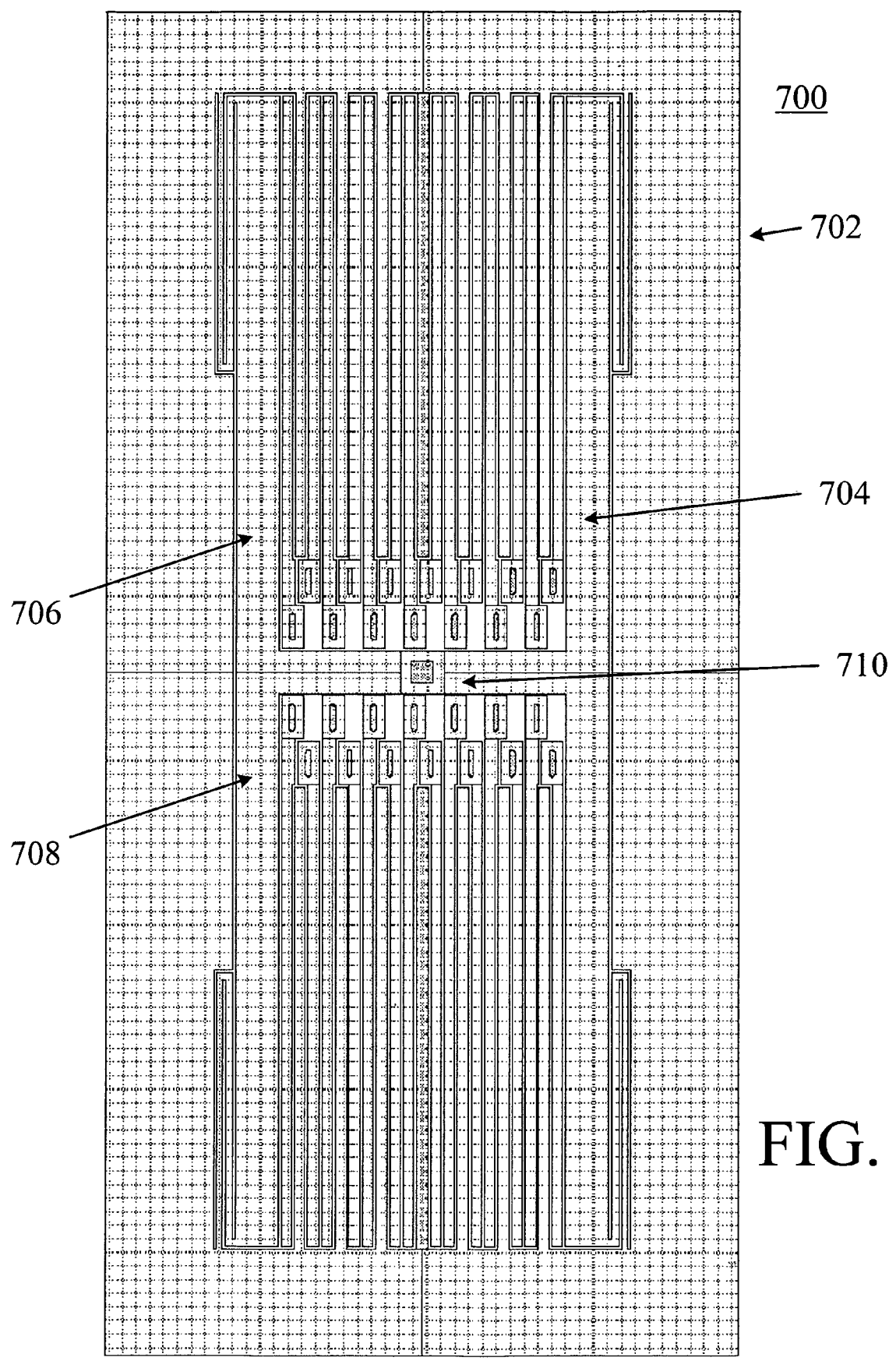
FIG. 3 shows a top view of a first exemplary single-axis accelerometer in accordance with an embodiment of the present invention.

FIG. 3 shows a top view of a first exemplary single-axis acceleration sensor 700 in which the mass support structures are configured in an "H" configuration in accordance with an embodiment of the present invention. The acceleration sensor 700 includes a mass with integral fingers 702, mass support structures 704 that are anchored to the substrate (not shown) by a single anchor 710 positioned at the middle of the "H" configuration, and sensing fingers 706 and 708 affixed to the substrate. The mass 702 is supported by a suspension spring at the end of each support arm.

Figure 4:
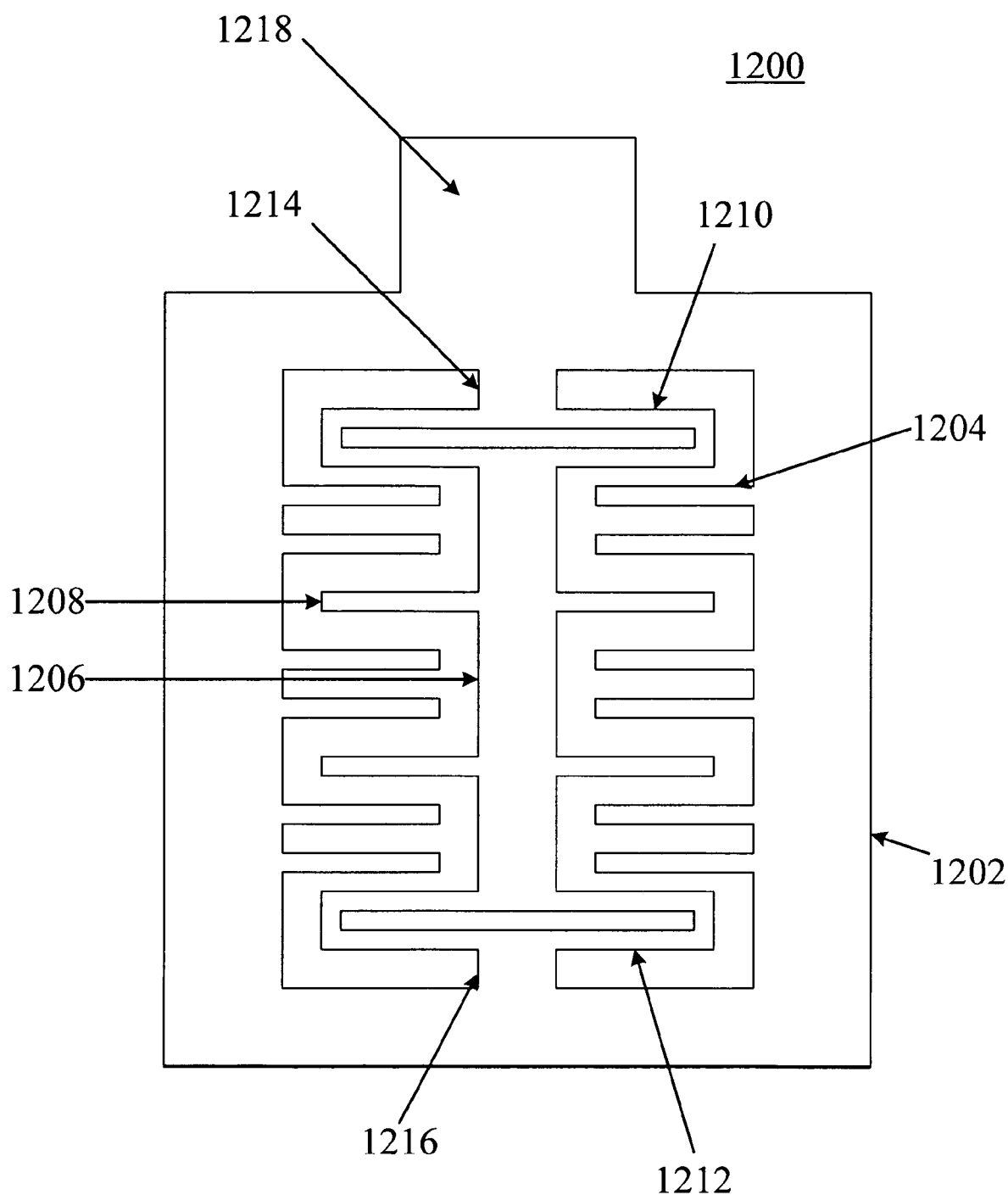
FIG. 4 shows a top view of a second exemplary single-axis accelerometer in accordance with an embodiment of the present invention.

FIG. 4 shows a top view of a second exemplary single-axis acceleration sensor 1200 in which offset is reduced by suspending all structures within a frame 1202. The frame 1202 has an outer periphery, a cavity defining an inner periphery, and a plurality of elongated sensing fingers 1204 along a portion of the inner periphery. A mass 1206 is positioned within the inner periphery of the frame 1202. The mass 1206 includes a plurality of elongated fingers 1208 positioned substantially alongside the sensing fingers 1204. The mass 1206 is suspended from the frame 1202 at either end by two springs 1210 and 1212, which are connected to the frame 1202 respectively at bridges 1214 and 1216. The entire structure, including the frame 1202 with sensing fingers 1204, the mass 1206 with fingers 1208, the springs 1210 and 1212, and the bridges 1214 and 1216 are typically formed from a single wafer, and itself is suspended from other components at bridge 1218. It should be noted that components inside the frame 1202 can be oriented perpendicular to the axis shown.

X-axis and/or Y-axis movement of the mass (i.e., within the device plane) is sensed by measuring capacitance between the mass and the fixed sensing fingers, with a change in capacitance reflecting an in-plane lateral acceleration. Z-axis movement of the mass is sensed by measuring (1) a reference capacitance (Cf) between the fixed sensing finger(s) and the underlying conducting plane and (2) a measurement capacitance (Cv) between the mass and the underlying conducting plane, with a change in the difference between the two values reflecting a Z-axis acceleration. In essence, then, the capacitance from the fixed fingers to the underlying conducting plane forms a reference capacitance that reflects the spacer gap, while the capacitance from the mass to the underlying conducting plane is a measurement of Z displacement resulting from Z acceleration.

In accordance with exemplary embodiments of the present invention, Z-axis acceleration can be quantified by measuring a reference capacitance (Cf) between the fixed sensing fingers and the underlying conducting plane, measuring a measurement capacitance (Cv) between the mass and the underlying conducting plane, and computing Cv-KCf, where K is adjusted to take off the zero-acceleration position of the mass. Generally speaking, even if Cf varies somewhat with Z-axis acceleration, it generally has a small effect on the scale factor. This method provides a stable zero reference, since both Cf and Cv are typically of the same dielectric and construction. Also, since both reflect the spacer gap, it is generally not necessary to have a very large offset adjustment range—the offset is generally predictable within close limits.

K can be created by scaling the clock edge used to read the larger capacitance (usually Cv). It is desirable to involve all the fixed fingers in the reference measurements, if possible, to get Cf as close as possible to Cv. It is also desirable to read (Cv-K Cf) on a single clock edge, so that only the difference has to be processed—it is generally a much smaller signal than either piece alone, and it ensures identical scale factors applied to each term (except for K), avoiding the difficulties of a difference of large-numbers measurement.

Figure 5:
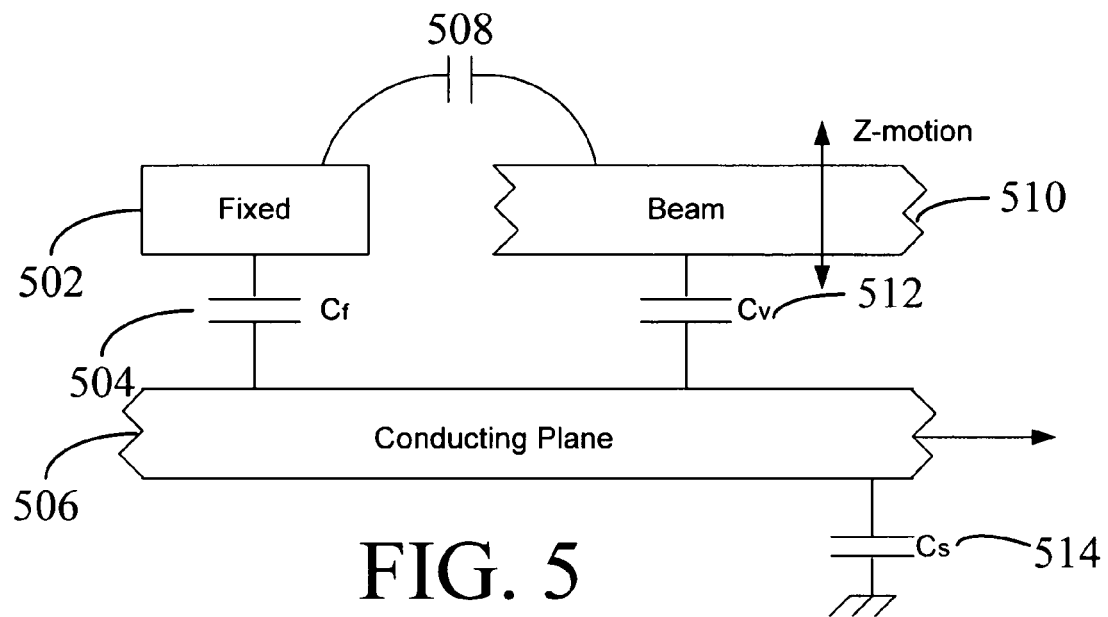
FIG. 5 shows a representation of a partial cross-sectional view of an accelerometer in accordance with an embodiment of the present invention.

FIG. 5 shows a representation of a partial cross-sectional view of an accelerometer in accordance with embodiments of the present invention. For clarity, only one axis of lateral fixed fingers is shown. As discussed above, fixed finger 502 and beam (mass) 510 are oriented substantially in the same device plane above and parallel to an underlying conducting plane 506. The beam 510 can move along at least one axis in the device plane as well as in a Z axis (shown by the arrow) that is normal to the device plane. In order to sense lateral movement of the beam 510 within the device plane, capacitance 508 (i.e., between the fixed finger 502 and the beam 510) is measured. In order to sense Z-axis movement of the beam 510, reference capacitance Cf 504 (i.e., between the fixed finger 502 and the conducting plane 506) and measurement capacitance Cv 512 (i.e., between the beam 510 and the conducting plane 506) are measured. Generally speaking, conducting plane capacitance Cs 514 is significantly greater than Cf 504 or Cv 512. Thus, the conducting plane capacitance Cs 514 should affect Cf 504 and Cv 512 equally and not influence the offset, although Cs 514 may be within the sensitivity of Cf 504 and Cv 512.

Figure 6:
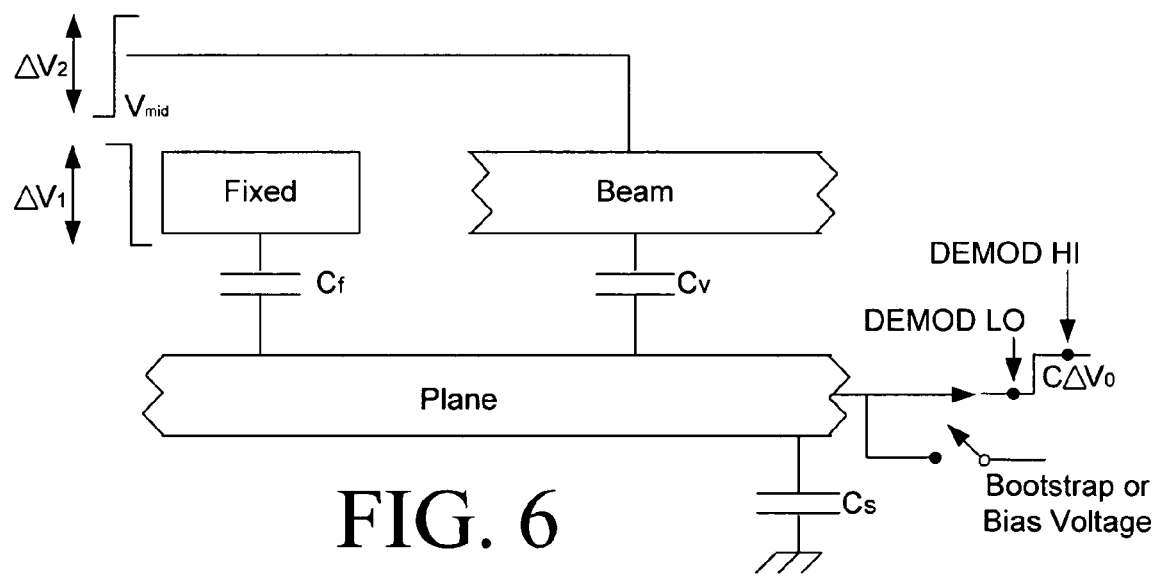
FIG. 6 demonstrates an exemplary technique for measuring Z-axis acceleration in accordance with an embodiment of the present invention.

FIG. 6 demonstrates an exemplary technique for measuring Z-axis acceleration in accordance with an embodiment of the present invention. Since Cf will generally be smaller than Cv, and since the fixed fingers are typically already connected to clock drivers, $\Delta V_1$ (i.e., delta $V_1$) is set to the standard clock-step (~Vdd). Clocking the fixed-finger part of the Z measurement is typically performed by setting up the timing so that all the fixed fingers (both phases of both lateral axes) step in the same direction at once.

A smaller step in the opposite direction should be applied to the beam to measure Cv. This may be done, for example, either with a second beam reset switch connected to Vmid+ $\Delta V_2$, or a switch that can select either Vmid or Vmid+$\Delta V_2$ to the (sole) reset switch. The $\Delta V_2$ tap is selected and the reset switch is activated in order to get an edge.

The underlying conducting plane should ordinarily be connected either to a fixed bias (Vmid) or a bootstrap signal (buffered beam). To read the net difference of (Cv-K Cf) out of this plane, the conducting plane is disconnected from its usual feed and the step that appears on the plane is read (i.e., amplified and demodulated).

Figure 7:
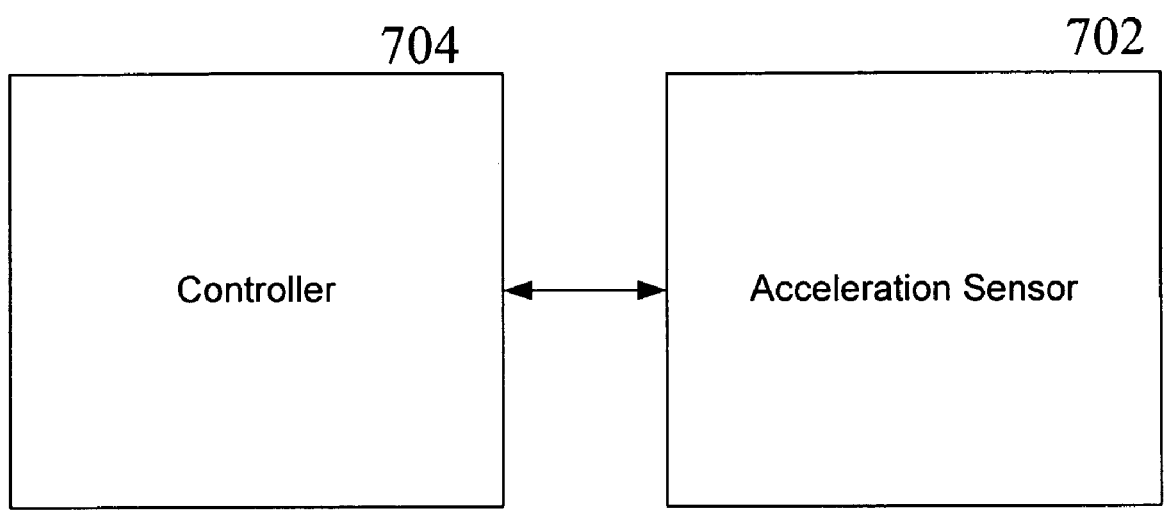
FIG. 7 shows the relevant components of an acceleration sensing system in accordance with an embodiment of the present invention.

FIG. 7 shows the relevant components of an exemplary acceleration sensing system in accordance with an embodiment of the present invention. Among other things, the acceleration sensing system includes an acceleration sensor 702 and a controller 704. The acceleration sensor 702 typically includes, among other things, a conducting plane and a plurality of sensing elements oriented in a device plane substantially parallel to the conducting plane. The sensing elements include, among other things, a mass and at least one fixed sensing electrode. At least one fixed sensing electrode is employed to sense movement of the mass along an axis in the device plane and to measure a reference capacitance used in sensing movement of the mass along an axis normal to the device plane. The controller 704 includes logic (e.g., hardware and/or software) for configuring electrical connections to the fixed sensing electrode(s), the conducting plane, and the mass for sensing movement of the mass along the axis within the device plane and also for sensing movement of the mass along the axis normal to the device plane, including measuring the reference capacitance between the fixed sensing electrode(s) and the conducting plane and measuring the measurement capacitance between the mass and the conducting plane. As described above, the controller 704 may sense movement of the mass along the axis normal to the device plane by measuring a reference capacitance Cf between the fixed sensing electrode(s) and the conducting plane, measuring a measurement capacitance Cv between the mass and the conducting is plane, and computing a value Cv-KCf, where Cf is the reference capacitance, Cv is the measurement capacitance, and K is a predetermined constant. The controller 704 may include components that are separate from the acceleration sensor 702 and/or integral to the acceleration sensor 702.

In embodiments of the invention, the fixed sensing fingers are electrically coupled in various configurations in order to detect accelerations using changes in capacitance due to movement of the mass. Furthermore, the micromachined acceleration sensor can be fabricated from different types of wafers, including silicon wafers, single-stack silicon-on-insulator (SOI) wafers, and multiple-stack SOI wafers. When the micromachined acceleration sensor is fabricated from SOI wafers that include a ground layer, the fixed sensing fingers can be anchored through to the ground layer in order to make certain electrical connections to the fixed sensing fingers.

It should be noted that the acceleration sensor used in the ADXL203 accelerometer is discussed herein as an exemplary type of acceleration sensor. Those skilled in the art should understand, however, that other single mass acceleration sensors may be modified or used in the discussed manner to produce the desired results. Accordingly, various embodiments of the invention are not limited to the specific details of the acceleration sensor used in the ADXL203 accelerometer. Its discussion is for illustrative purposes only.

Although the above discussion discloses various exemplary embodiments of the invention, it should be apparent that those skilled in the art can make various modifications that will achieve some of the advantages of the invention without departing from the true scope of the invention. The described embodiments are to be considered in all respects only as illustrative and not restrictive.

What is claimed is:

1. Apparatus comprising:
   an acceleration sensor having a plurality of sensing elements oriented in a device plane, the sensing elements including at least one fixed sensing electrode and a mass suspended so as to be movable relative to the at least one fixed sensing electrode along at least one axis in the device plane and along an axis normal to the device plane; and
   a controller operably coupled to sense movement of the mass along at least one axis in the device plane and along the axis normal to the device plane, the controller sensing movement of the mass within the device plane using at least one capacitor having a plate formed from at least one fixed sensing electrode and a plate formed by a surface that moves with the mass, the controller sensing movement of the mass along the axis normal to the device plane using a measurement capacitor and a reference capacitor, the measurement capacitor having a plate formed by the mass and a plate formed by an underlying conducting plane, the reference capacitor having a plate formed from at least one fixed sensing electrode used for sensing movement of the mass within the device plane and a plate formed by the underlying conducting plane.

2. Apparatus according to claim 1, wherein the acceleration sensor includes distinct sets of fixed sensing electrodes for sensing movement of the mass along each of two perpendicular axes in the device plane.

3. Apparatus according to claim 1, wherein the controller is operably coupled to sense movement of the mass along the axis normal to the device plane by measuring a reference capacitance between said at least one fixed sensing electrode and the conducting plane and measuring a measurement capacitance between the mass and the conducting plane.

4. Apparatus according to claim 1, wherein the plate of the reference capacitor is formed collectively from a plurality of fixed sensing electrodes used for sensing movement of the mass within the device plane.

5. Apparatus according to claim 2, wherein the plate of the reference capacitor is formed collectively from a plurality of fixed sensing electrodes including at least one fixed sensing electrode from each set.

6. Apparatus according to claim 3, wherein the controller computes a value Cv-KCf, where Cf is the reference capacitance, Cv is the measurement capacitance, and K is a predetermined constant.

7. Apparatus according to claim 3, wherein the controller is operably coupled to disconnect the conducting plane from a fixed bias or bootstrap signal for measuring the reference and measurement capacitances.

8. Apparatus according to claim 6, wherein K is adjusted to compensate for a zero-acceleration position of the mass.

9. Apparatus according to claim 6, wherein K is determined by scaling a clock edge used to read the larger of the reference capacitance and the measurement capacitance.

10. Apparatus according to claim 6, wherein the controller is operably coupled to read the value Cv-KCf on a single clock edge.

11. In an acceleration sensing apparatus having a plurality of sensing elements oriented in a device plane, the sensing elements including at least one fixed sensing electrode and a mass suspended so as to be movable relative to the at least one fixed sensing electrode along at least one axis in the device plane and along an axis normal to the device plane, a method for sensing acceleration, the method comprising:
   sensing movement of the mass along at least one axis in the device plane using at least one capacitor having a plate formed from at least one fixed sensing electrode and a plate formed by a surface that moves with the mass; and
   sensing movement of the mass along the axis normal to the device plane using a measurement capacitor and a reference capacitor, the measurement capacitor having a plate formed by the mass and a plate formed by an underlying conducting plane, the reference capacitor having a plate formed from at least one fixed sensing electrode used for sensing movement of the mass within the device plane and a plate formed by the underlying conducting plane.

12. A method according to claim 11, wherein the plurality of sensing elements includes distinct sets of fixed sensing electrodes for sensing movement of the mass along each of two perpendicular axes in the device plane.

13. A method according to claim 11, wherein sensing movement of the mass along the axis normal to the device plane comprises:

measuring a reference capacitance between said at least one fixed sensing electrode and the conducting plane; and measuring a measurement capacitance between the mass and the conducting plane.

14. A method according to claim 11, wherein the plate of the reference capacitor is formed collectively from a plurality of fixed sensing electrodes used for sensing movement of the mass within the device plane.

15. A method according to claim 12, wherein the plate of the reference capacitor is formed collectively from a plurality of fixed sensing electrodes including at least one fixed sensing electrode from each set.

16. A method according to claim 13, wherein sensing movement of the mass along the axis normal to the device plane further comprises:

computing a value Cv-KCf, where Cf is the reference capacitance, Cv is the measurement capacitance, and K is a predetermined constant.

17. A method according to claim 13, wherein measuring the reference and measurement capacitances comprises disconnecting the conducting plane from a fixed bias or bootstrap signal.

18. A method according to claim 16, wherein K is adjusted to compensate for a zero-acceleration position of the mass.

19. A method according to claim 16, wherein K is determined by scaling a clock edge used to read the larger of the reference capacitance and the measurement capacitance.

20. A method according to claim 16, wherein the value Cv-KCf is read on a single clock edge.

21. Apparatus for use with an acceleration sensor having a plurality of sensing elements oriented in a device plane, the sensing elements including at least one fixed sensing electrode and a mass suspended so as to be movable relative to the at least one fixed sensing electrode along at least one axis in the device plane and along an axis normal to the device plane, the apparatus comprising:

means for sensing movement of the mass along at least one axis in the device plane using at least one capacitor having a plate formed from at least one fixed sensing electrode and a plate formed by a surface that moves with the mass; and means for sensing movement of the mass along an axis normal to the device plane using a measurement capacitor and a reference capacitor, the measurement capacitor having a plate formed by the mass and a plate formed by an underlying conducting plane, the reference capacitor having a plate formed from at least one fixed sensing electrode used for sensing movement of the mass within the device plane and a plate formed by the underlying conducting plane.

* * * * *